Oct. 14, 1969    J. G. FENWICK    3,472,539
TUBULAR FRAME JOINT MEMBER
Filed Jan. 2, 1969
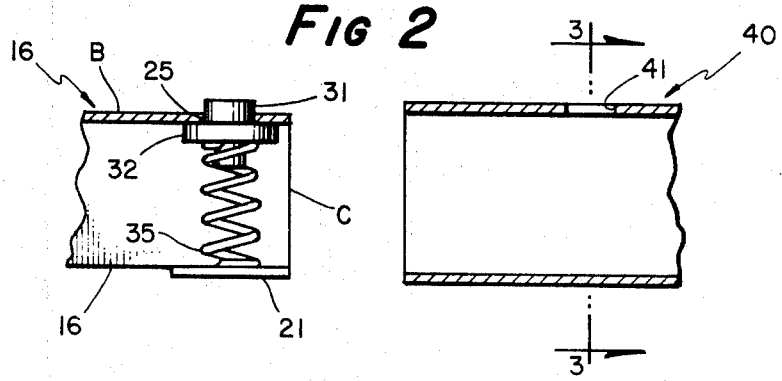
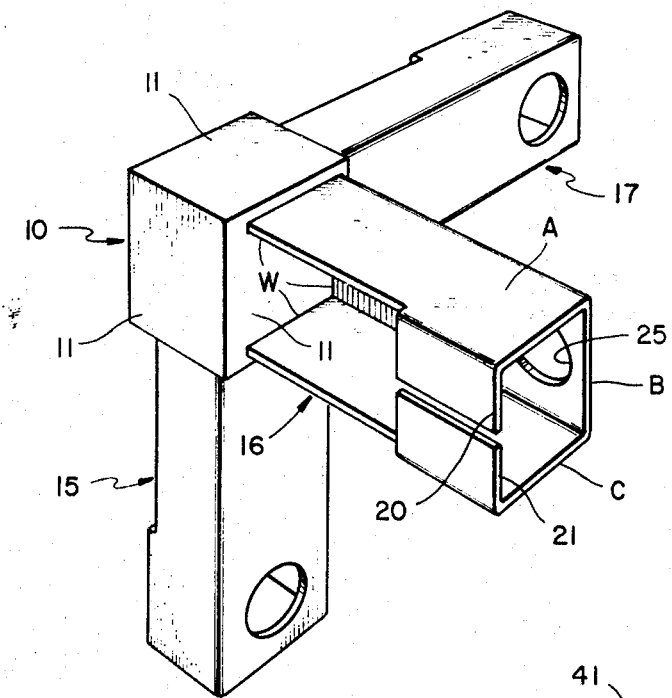
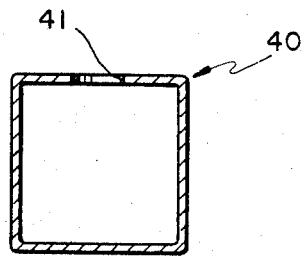
INVENTOR
JAY G. FENWICK
BY *Wayne B. Easton*
Attorney

United States Patent Office 3,472,539
Patented Oct. 14, 1969

3,472,539
TUBULAR FRAME JOINT MEMBER
Jay G. Fenwick, Albert Lea, Minn., assignor to Streater Industries Inc., Albert Lea, Minn., a corporation of Minnesota
Filed Jan. 2, 1969, Ser. No. 788,664
Int. Cl. F16b 7/00; E04g 7/00
U.S. Cl. 287—54          5 Claims

ABSTRACT OF THE DISCLOSURE

The invention relates to a tubular frame joint member which has a solid steel, rectangularly shaped block member. From one to six tubularly shaped locking horns are welded respectively to from one to six sides of the block member. The locking horns of the joint are adapted to have tubular members of varying length snapped thereon in locking engagement in connection with using the joints to assemble framed structures.

---

The invention relates to a new and improved tubular frame joint member.

Elongated tubular members and telescoping type joints have long been used for tubular type framing assemblies such as scaffolding and for the frames of other articles such as desks and tables. Many types of joints have been devised for use with elongated tubular members because the need and desire for improvements in this art are quite strong in view of the extremely widespread use of tubular framing structures in connection with a wide variety of building activities.

The tubular frame joint member of the present invention comprises a solid steel block to the six sides of which are attached from one to six tubular locking horns. The locking horns telescopically receive elongated tubular structurtl members which snap into locking engagement with the locking horns. As the joint member can have different arrangements and different numbers of locking horns attached thereto within the scope of the invention, joints with a variety of such arrangements can be used for different shapes of frame assemblies and the joints can serve as the basis for a universal type of framing system which not only provides for great flexibility and uniformity but is also very conductive to being modularized.

A main object of the invention is to provide a new and improved tubular frame joint member as described and having the advantages referred to.

Other objects and advantages of the invention will become apparent from the following specification, drawings and appended claims.

FIG. 1 is a perspective view of a tubular frame joint embodying the invention and having the form of a three dimensional corner joint;

FIG. 2 is a sectional view showing how the corner joint shown in FIG. 1 is connectable to a tubular frame member; and FIG. 3 is a sectional view taken on line 3—3 of FIG. 2.

Referring to the drawing, the tubular frame joint shown in perspective in FIG. 1 has the form of a three dimensional corner joint. This joint comprises a rectangularly shaped block 10 having generally square sides 11 and preferably is solid steel. As illustrated, three identical locking horns 15, 16 and 17 are rigidly attached to sides 11 of the block 10 as by welding.

The locking horns 15, 16 and 17 are arranged so that each horn has an orthogonal relationship with the other two horns and this arrangement forms a three dimensional corner joint.

Each of the locking horns has a hollow or tubular construction and a description of horn 16 will also serve as a description for horns 15 and 17. Horn 16 may have four walls arranged in box form within the scope of the invention. A three-sided wall arrangement is illustrated, however, the walls being designated A, B and C. The three sided wall arrangement has the advantage that the weldments W for attaching the horn to the block sides 11 may be internally of the horn where they won't interfere with a tubular member which slides over the horn in telescoping fashion into abutting engagement with a block side 11.

Between horn walls A and C, and attached to these walls, are tab portions 20 and 21 which extend towards each other in parallel relation to horn wall B. The tabs 20 and 21 are spaced from the block side 11 to which the horn 16 is attached to allow the weldments W to be made as referred to above.

Located above tabs 21 and 22 in the horn wall B is a hole 25 as shown in FIGS. 1 and 2. A button having a cylindrically shaped head 31 of the same nominal diameter as the hole 25, and a collar 32 of larger diameter than the hole 25, has the head 31 thereof slidably disposed in the hole 25 as indicated in FIG. 2. A coil spring 35 engages and extends between the tabs 21 and 22 and the button collar 32 to resilient 16 bias button 30 towards horn wall B to maintain the button head in the hole 25 as illustrated in FIG. 2. The height of button head 31 above the collar 32 is approximately twice the thickness of horn wall B so that it extends a distance above the wall B as shown in FIG. 2.

FIGS. 2 and 3 shows a tubular member 40 having a generally rectangularly shaped cross section and a hole 41 in one wall thereof. The inner perimeter of tubular member 40 is nominally the same dimensionally as the outer perimeter of horn 16. Tubular member 40 is attachable to horn 16 by being telescopically slidable over the horn while the button 30 is depressed and is held in an attached position by reason of the button head 31 snapping into the tubular member hole 41.

Tubular member hole 41 is spaced from the left end of tubular member 40 the same distance horn hole 25 is spaced from the block side 11 to which the horn 16 is attached. The left end of the tubular member 40 thus abuts a block side 11 when the tubular member is in its installed position and this provides a rigid and strong construction.

The outer cross sectional perimeter of the horns is dimensioned and shaped relative to the perimeter of a block side 11 so that the outer cross sectional perimeter of a tubular member 40 will coincide substantially exactly with the perimeter of the block side 11 to which the horn is attached. The outer surfaces of the walls of the tubular member, such as the tubular member 40, will thus merge smoothly with the four block sides 11 which surround the block side 11 to which the horn, such as the horn 16, and a tubular member, is attached. This not only imparts a very clean and simple appearance to the resulting frame structure but provides planar frame surfaces to which panelling and other apparatus can be attached without encountering parts of the framework which jut out and have to be accommodated in some way when objects are attached to the framework.

The joint shown in FIG. 1 is illustrated as having three horns 15, 16 and 17 but it is within the scope of the invention that one to six horns could be attached to the six sides 11 of the block 10 in any desired arrangement to produce a desired type of joint.

It is intended that the type of joint disclosed herein be the basis for a framing system. The manufacturer would produce such joints having different arrangements of horns with one to six horns being attached to the block 10 and the user of the joints could use them in the manner of an "erector" set whereby any type or size of frame structure could be assembled with the use of joints having different horn arrangements. The manufacturer could also supply tubular members such as the tubular member 40 of different lengths in accordance with a form of modular system so that any desired framing structure could be assembled without the use of any tools and the resulting structure would be modular by reason of the tubular members 40 being of modular lengths.

What I claim is:

1. A tubular frame joint for joining elongated tubular members, comprising, a rectangularly shaped block having six orthogonally arranged sides, a tubularly shaped locking horn fixedly attached to and extending from one of said sides, said locking horn having three walls with a hole in one of said walls in spaced relation to said block with each of said three walls being orthogonally arranged relative to the other two walls, a fourth wall extending between two of said three walls, said fourth wall being axially spaced from said one of said sides of said block so as to form an access opening between the side of said block and said fourth wall for attaching said horn to said block as by welding.

2. A tubular frame joint according to claim 1 wherein a plurality of horns similar to said horn are attached respectively to said block sides.

3. A tubular frame joint according to claim 1 wherein said fourth wall portion is formed by tab members extending from two parallel ones of said walls.

4. A tubular frame joint according to claim 1 wherein the external perimeter of said locking horn is in inwardly spaced relation to the perimeter of the side of said block to which said horn is attached.

5. A tubular frame joint according to claim 4 wherein said horn is spaced equal distances from said perimeter of the block side to which said horn is attached, said equal distances being equal to the thickness of the walls of said elongated tubular members.

References Cited

FOREIGN PATENTS 188,408   3/1964   Sweden.
656,903   1/1965   Belgium.

DAVID J. WILLIAMOWSKY, Primary Examiner

A. V. KUNDRAT, Assistant Examiner

U.S. Cl. X.R.

182—224; 287—189.36